US009406206B2

(12) United States Patent
McKiel, Jr.

(10) Patent No.: US 9,406,206 B2
(45) Date of Patent: Aug. 2, 2016

(54) DATA DISPLAY FOR SIGNALING AID IN EMERGENCY AND DISASTER SITUATIONS

(71) Applicant: Verizon Patent and Licensing Inc., Arlington, VA (US)

(72) Inventor: Frank A. McKiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/478,961

(22) Filed: Sep. 5, 2014

(65) Prior Publication Data
US 2016/0071379 A1    Mar. 10, 2016

(51) Int. Cl.
G08B 3/00 (2006.01)
G08B 5/00 (2006.01)
G08B 7/00 (2006.01)
G08B 5/36 (2006.01)
G01S 5/18 (2006.01)
G01S 1/68 (2006.01)
G08B 25/01 (2006.01)

(52) U.S. Cl.
CPC ... *G08B 5/36* (2013.01); *G01S 1/68* (2013.01); *G01S 5/183* (2013.01); *G08B 5/002* (2013.01); *G08B 25/016* (2013.01)

(58) Field of Classification Search
CPC ............. B63C 9/21; G01S 1/68; G01S 5/183; G08B 5/002; G08B 25/016
USPC .................... 340/691.6, 573.1, 473; 116/200; 342/386; 455/90.1, 404.1
See application file for complete search history.

(56) References Cited

U.S. PATENT DOCUMENTS

| | | | | |
|---|---|---|---|---|
| 5,262,768 A | * | 11/1993 | Florer | G08B 5/002 340/473 |
| 6,178,915 B1 | * | 1/2001 | Salandra | A62B 33/00 116/210 |
| 6,195,039 B1 | * | 2/2001 | Glass, Jr. | B63C 9/21 342/386 |
| 6,260,508 B1 | * | 7/2001 | Morse | G08B 5/002 116/211 |
| 7,839,290 B2 | * | 11/2010 | Chidakel | G01S 5/183 340/573.1 |

(Continued)

OTHER PUBLICATIONS

International Standard, "Information technology—Automatic identification and data capture techniques—Bar code symbology—QR Code," ISO/IEC 18004:2000(E), First edition, Jun. 15, 2000 (available at http://www.raidenii.net/files/datasheets/misc/qr_code.pdf, visited Sep. 5, 2014).

*Primary Examiner* — John A Tweel, Jr.

(57) ABSTRACT

A user device may be used to communicate a message to a rescue vehicle, such as a helicopter, an airplane, etc. A user may provide the user device with message content data, such as a name, a description of a geographic location, whether the user is in need of medical attention, etc., and the user device may create a message pattern based on the message content data. The message pattern may correspond to a machine-readable code, such as a Quick Response (QR) code. The message pattern may be copied to a display panel of a display kit, which may include dimensions suitable for displaying the message pattern to a rescue vehicle in a manner that enables the rescue vehicle to translate the message pattern back into message content data for the effective deployment of search and rescue resources and/or for notifying individuals concerned with the welfare of the user.

20 Claims, 13 Drawing Sheets

(56) References Cited

U.S. PATENT DOCUMENTS

| | | | |
|---|---|---|---|
| 8,253,576 B2 * | 8/2012 | Witzel | G01S 1/70 340/573.4 |
| 8,441,360 B2 * | 5/2013 | Witzel | G01S 1/70 340/573.1 |
| 8,708,919 B1 * | 4/2014 | Frazier | A61B 5/0015 600/484 |
| 2005/0118950 A1 * | 6/2005 | Zechlin | H04B 1/7156 455/41.2 |
| 2006/0148423 A1 * | 7/2006 | Sharpe | G08B 25/016 455/90.1 |

* cited by examiner

DATA DISPLAY FOR SIGNALING AID IN EMERGENCY AND DISASTER SITUATIONS

BACKGROUND

After a natural disaster, such as a flood, earthquake, tornado, or other calamity, helicopters, planes, and other rescue vehicles are often deployed as part of a search and rescue effort to help survivors. While such efforts can be successful in locating and assisting survivors, currently available solutions for assisting survivors of a natural disaster have various limitations. For instance, survivors often must communicate with rescue vehicles using basic signaling techniques, such as starting fires, waving clothing or flags, using reflective surfaces to direct light, or spelling out short messages using rocks, debris, or other moveable objects. Unfortunately, such techniques are incapable of communicating more sophisticated information, such as a number of survivors, whether any of the survivors are in need of medical attention or medicine, whether the survivors have access to food, water, and shelter, etc., making it difficult to allocate rescue resources to survivors according to need and urgency.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for creating a sign that may enable a survivor of a natural disaster, or an individual in analogous circumstances, to communicate a sophisticated message to a rescue vehicle, such as a helicopter, an airplane, an unmanned aerial vehicle (UAV), a boat, etc. The message may be encoded as a message pattern that conveys one or more of a name of the survivor, a medical condition of the survivor, medication required by the survivor, a number of individuals with the survivor, whether food, water, and/or shelter is available to the survivor, and more. Creating and/or communicating the message may not require a functioning power grid (e.g., a power plant, power lines, transformers, outlets, etc.), so the message may be communicated to the rescue vehicle even when the power grid is down. Additionally, or alternatively, the message may be quickly relayed from the rescue vehicle to rescue workers, family members, or other types of individuals concerned with the circumstances and welfare of the survivor.

Figure 1:
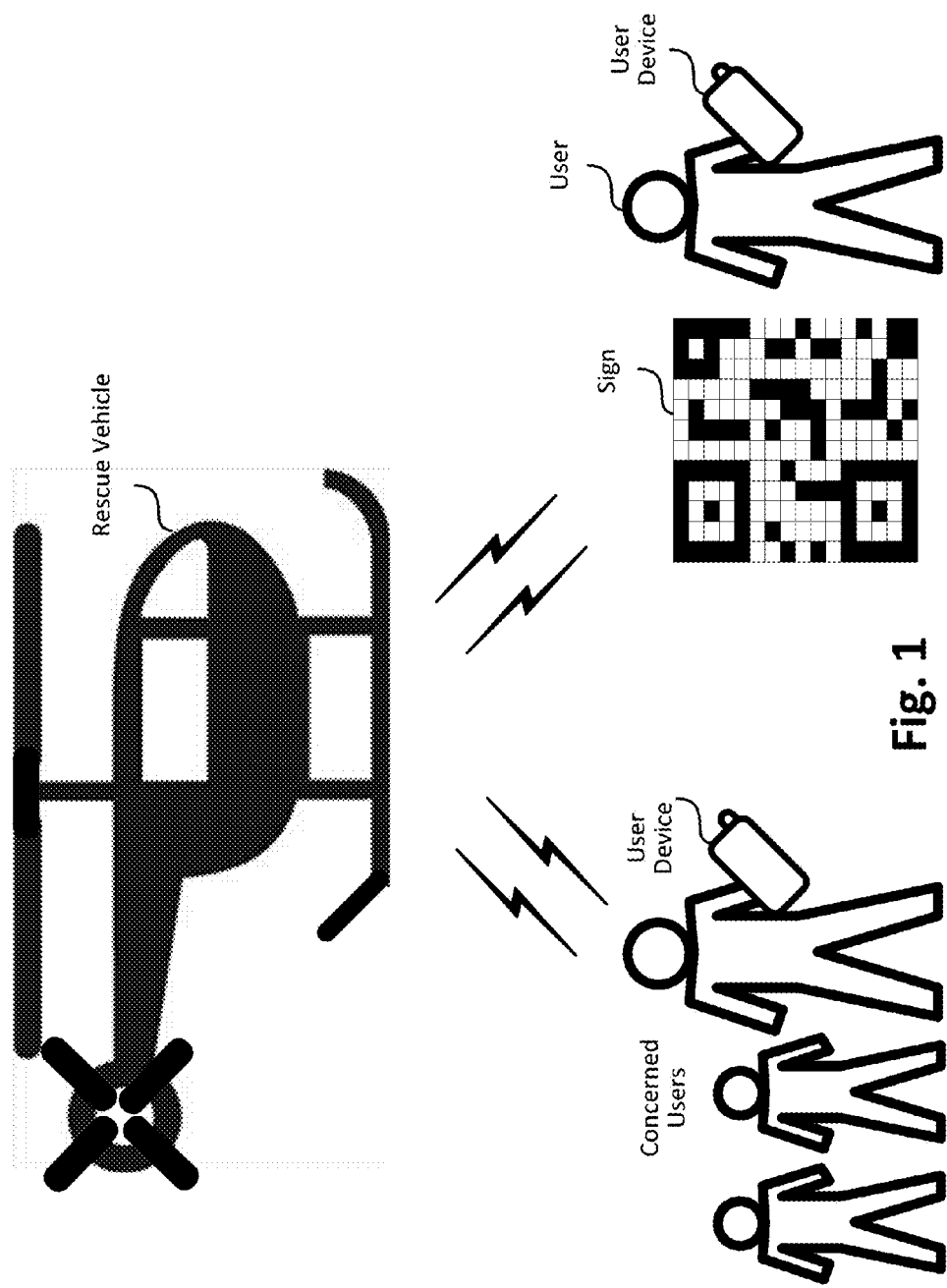
FIG. 1 illustrates an example overview of an implementation described herein.

FIG. 1 illustrates an example overview of an implementation described herein. As illustrated, assume that a user ("user") is in need of emergency or rescue services, a rescue vehicle is flying overhead in search of the user, and that one or more other users ("concerned users") are concerned with the circumstances and welfare of the user. The user may have a user device (e.g., a smartphone) and a display kit for creating a sign. The display kit may include materials that can be used to create the sign, such as a white or reflective display panel and materials to write on the display panel, such as a set of adhesive or magnetic black squares, a roll of black tape, a marker, etc. The display kit may be distributed to the public in advance of need.

The user may provide a name, a time and date, a number of people, a medical condition, and/or other types of message content data to the user device, and the user device may display a message pattern based on the message data received from the user and/or output instructions to the user for recreating the message pattern. The format of the message pattern may correspond to one or more codes, such as Quick Response Code (QR Code), a barcode, and/or another type of code, and the content encoded by the message pattern may include some or all of the message content data provided by the user.

The message pattern may be copied onto the display panel of the display kit to create a sign that encodes the message. The dimensions of the sign may be such that the message pattern on the sign is readable (e.g., able to be scanned) by the rescue vehicle. The rescue vehicle may decode the message pattern in order to respond to the user based on the encoded content of the sign. Additionally, or alternatively, the rescue vehicle may transmit the message pattern and/or the content of the message pattern to a user device of one or more concerned users so that concerned users are aware of the user and the user's circumstances.

In some implementations, the user may create a message pattern on the display panel of the display kit without employing the user device by following one or more written instructions and/or decipherable prompts corresponding to the display kit. For example, the display kit may comprise a white or reflective display panel, such as a 4×4 foot flat panel, and a set of adhesive or magnetic black squares or a roll of black tape, and instructions for arranging the black display covers on the white display panel to manually create a sign that encodes the message (e.g., the message communicating a name of the user, a description of the geographical location of the user, a medical condition of the user, etc.). Accordingly, the techniques described herein may enable a user to communicate sophisticated messages to rescuers and/or other types of individuals concerned with the welfare and circumstances of the distressed individual, thereby facilitating effective rescue efforts.

Figure 2:
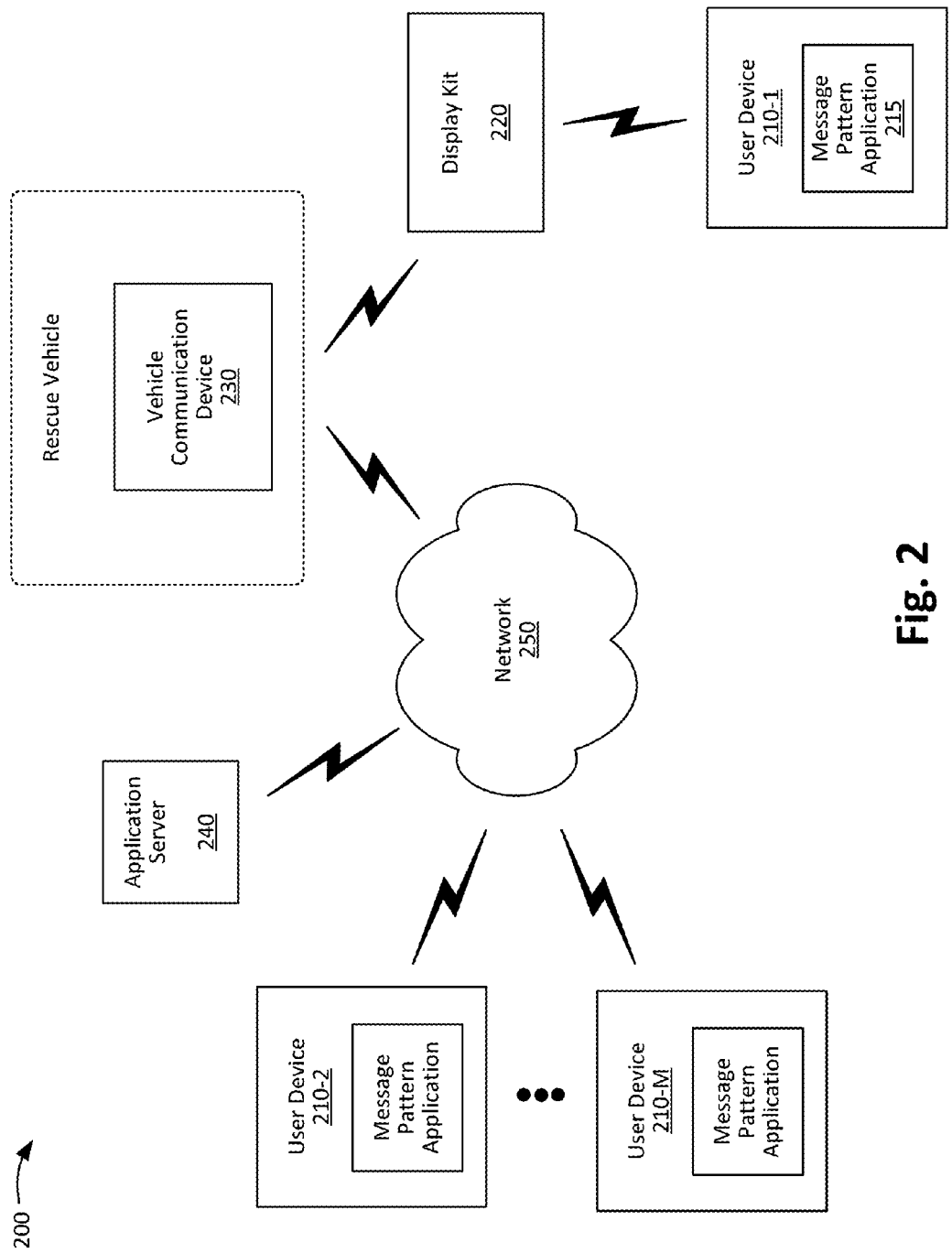
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 and 210-2 through 210-M (where M is an integer greater than or equal to 2), display kit 220, vehicle communication device 230, application server 240, and network 250.

User device 210 may include a device capable of communicating via a network, such as network 250, under normal conditions (e.g., prior to a disaster that disables some or all of network 250). For example, user device 210 may correspond to a mobile communication device (e.g., a smartphone, or a personal digital assistant (PDA)), a portable computer device (e.g., a laptop computer, a tablet computer, a wearable computer), and/or another type of device. In some implementations, user device 210 may include an electronic device that is not capable of communicating with network 250 but is otherwise capable of operating in a manner consistent with one or more implementations described herein. In some implementations, user device 210 may display text, display graphics, produce audio signals, etc.

As depicted, user device 210 may include a message pattern application 215 installed on a memory device of user device 210. Message pattern application 215 may generally assist a user of user device 210 in creating a sign that can be displayed to rescue personnel. In one implementation, message pattern application 215 may generate a QR code that the user can reproduce using display kit 220. Alternatively or additionally, when display kit 220 is not available (e.g., the distressed user is not in possession of display kit 220), message pattern application 215 may assist the user in constructing a sign using materials that are available to the user (e.g., rocks, wood, patterns in dirt, etc.). In one implementation, message pattern application 215 may generate a QR code based on the QR code standard ISO/IEC (International Organization for Standardization/International Electrotechnical Commission) 18004:2006. In one implementation, message pattern application 215 may customize the information content of the sign based on the materials available to the user. For example, when display kit 220 is available, message pattern application 215 may assist the user in generating a relatively high information content sign (e.g., the sign may provide information about the number of distressed individuals, the medical condition of the individuals etc.). When display kit 220 is not available, however, message pattern application 215 may assist the user in generating a relatively low information content sign (e.g., the sign may provide indicate only that medical care is urgently needed). The operation of message pattern application 215 will be described in more detail below.

Display kit 220 may include one or more materials that can be used to construct a sign that is readable by vehicle communication device 230. Display kit 220 may include a solid surface comprising a front side and a back side, and being made from one or more materials, such as paper, wood, rubber, plastic, metal, glass, and/or one or more other types of materials suitable for functioning in a manner described herein. In some implementations, display kit 220 may include an electronic device, such as a liquid crystal display (LCD) device or electrophoretic device capable of receiving data representing a message pattern from user device 210 and displaying the message pattern to vehicle communication device 230. In such implementations, display kit 220 may include an independent power source (e.g., a battery) for displaying the message pattern without the assistance of a power grid. Additionally, or alternatively, display kit may include a mechanical device (e.g., a sign) that a user may use to create a message pattern. Depending on the implementation, the message pattern may be manually created by the user based on a message pattern created by user device 210 and/or based on one or more instructions made available to the user via, for example, a message pattern manual (not shown) or printed on the display kit 220 itself. In some implementations, display kit 220 may include a combination of, for example, an LCD device implementation on one side of a panel in display kit 220 and a mechanical device implementation on an opposite side of the panel, to provide a user with multiple options for creating a message pattern using display kit 220.

Figure 3A:
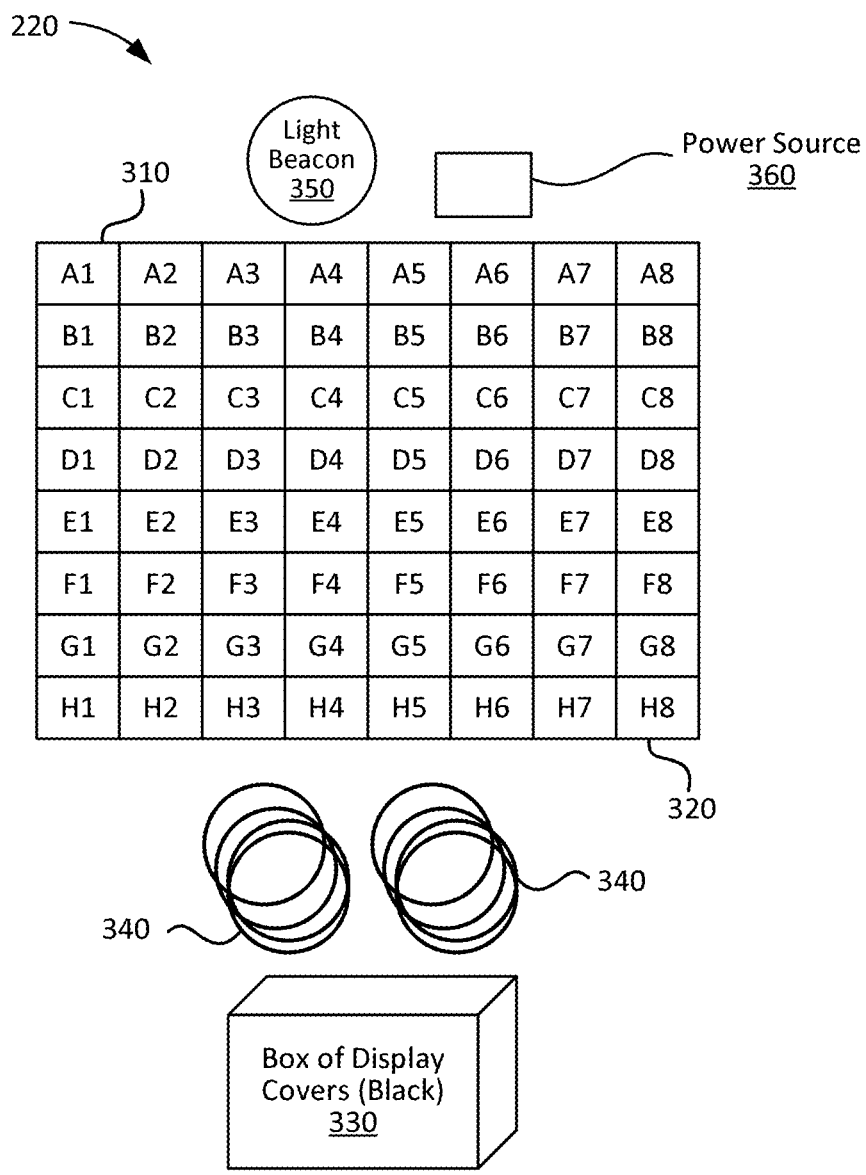
FIG. 3A illustrates an example implementation of a display kit.

FIG. 3A illustrates an example implementation of a display kit 220. As shown, display kit 220 may include a display panel 310, a box of display covers 330, elastic ties 340, a light beacon 350, and a power source 360. Display panel 310 may include multiple shapes 320 that each include an identifier (e.g. A1, A2, A3, etc.). Additionally, or alternatively, the identifier for each shape 320 may include a barcode, a letter, a number, or any other type of unique identifier. Additionally, or alternatively, display panel 310 may include another type of identification system for each shape 320, such as a coordinate system with letters identifying columns of display 310 and number identifying rows of display 310. Display covers 330 (shown as "box of display covers (black) 330 in FIG. 3) may include plates or tablets, made of plastic, ceramic, magnetic material, hook and loop fastener (e.g., Velcro), tapered pegs and holes, or any other type of suitable material, that can be arranged on a front side of display panel 310 to create a message pattern that is readable by vehicle communication device 230. Additionally, or alternatively, display panel 310 may include scratch off blocks (e.g., where a user may scratch off parts of a film covering display panel 310 to create a light/dark contrast on display panel 310), a marker, paint, etc.

Elastic ties 340 may be used to fasten display panel 310 to a particular location, at a particular angle and/or height, etc., by attaching elastic ties 340 to display panel 310 in a manner shown in FIG. 3. In some implementations, one or more other types of devices (e.g., a latching system, an adhesive system, an anchor system, a scaffolding system, etc.) may be used in addition to, or instead of, elastic ties 340. Additionally, or alternatively, sign 300 may be secured using a different number of elastic ties 340 and/or by using elastic ties 340 in a different manner, such as by using four separate elastic ties 340 that are each attached to a different corner of display panel 310. Light beacon 350 and power source 360 may be attached to display panel 310 (or independently implemented as part of display kit 220) for initially attracting a rescue vehicle from a significant distance. In some implementations, another type of homing system may be used, such as a radio transmitting system or an electrochemical system that activates upon, for example, breaking, bending, or otherwise disrupting a flexible casing of light beacon 350.

In some implementations, display kit 220 may include a case or other apparatus for packaging and/or transporting the components of display kit 220. Additionally, or alternatively, display panel 310 may be folded one or more times and/or disassembled into one or more sub-components to facilitate storage and/or mobility. As such, while FIG. 3A shows an example display kit 220 with various features and components, in other implementations, an example display kit may include fewer features and/or components, different features and/or components, differently arranged features and/or components, and/or additional features and/or components than those depicted in FIG. 3A.

Figure 3B:
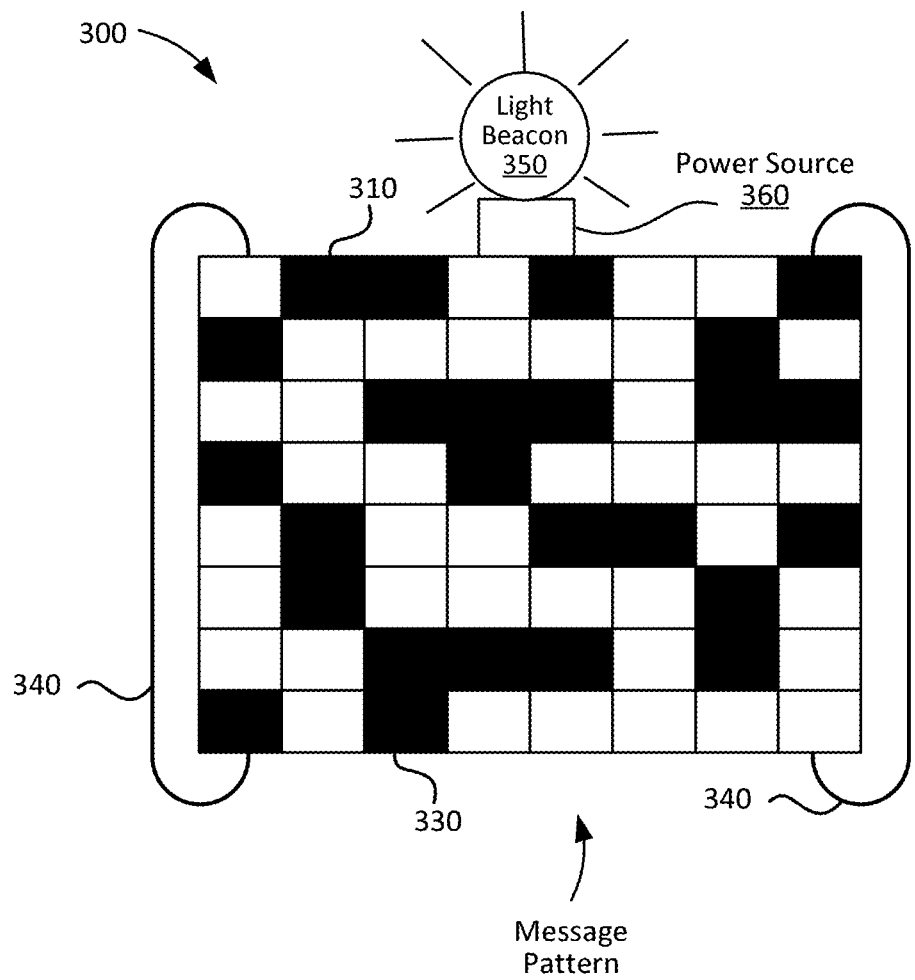
FIG. 3B is a diagram illustrating an example of an assembled version of a display kit 220 (e.g., as shown in FIG. 3A) as a sign 300.

FIG. 3B is a diagram illustrating an example of an assembled version of display kit 220 (e.g., as shown in FIG. 3A) as sign 300. As shown, display covers 330 may be arranged on display panel 310 so as to create a message pattern, which may be readable by vehicle communication device 230. Elastic ties 340 may be connected to display panel 310 and/or used to secure sign 300 to a particular location or position. For instance, elastic ties 340 may be used to secure sign 300 to a tree, a rock, debris, wreckage, or another object so that, for example, the sign 300 remains visible to a rescue vehicle. Light beacon 350 and power source 360 may be attached to display panel 310 to increase the visibility of sign 300. Light emitted from light beacon 350 may be constant and/or blinking. Additionally, or alternatively, light beacon 350 may include another type of beacon, such as a radio transmitter. Accordingly, the components of display kit 220, as shown in FIG. 3A, may be assembled to create a sign, such as sign 300 of FIG. 3B.

Referring back to FIG. 2, vehicle communication device 230 may include one or more devices capable of reading an encoded message pattern. Vehicle communication device 230 may include one or more components, such as an optical sensor for scanning a message pattern, a processor for converting the message pattern into text and/or images, a display for displaying the text and/or images to an operator of a rescue vehicle, and/or an output device for communicating the message pattern and/or information derived from the message pattern to one or more devices, such as another user device 210, application server 240, etc. Vehicle communication device 230 may be installed on one or more types of rescue vehicles, such as a helicopter, an airplane, a UAV, a boat, etc. Additionally, or alternatively, vehicle communication device 230 may be installed on non-rescue vehicle, such as a satellite. In some implementations, vehicle communication device 230 may be a device that is designed to be carried by a user and may not necessarily be installed in a vehicle.

Application server 240 may include one or more computing devices, such as a server device or a collection of server devices. Application server 240 may operate as an application server for message pattern application 215 of user device 210 by, for example, providing a source for downloading message pattern application 215 and updates to message pattern application 215. Application server 240 may also, or alternatively, perform one or more operations relating to systems, features, and processes described herein, such as receiving a message pattern, or an encoding/decoding thereof, from vehicle communication device 230, communicating a message pattern, or an encoding/decoding thereof, to vehicle communication device 230, encoding/decoding a message pattern, communicating a message pattern, or an encoding/decoding thereof, to user device 210 (e.g., user device 210-2), etc.

In some implementations, a user of user device 210 (e.g., user device 210-2) may be required to input a password and/or one or more other types of information in order to access a message pattern, or an encoding/decoding thereof, from application server 240. Implementing security policies, such as requiring a password to access a message pattern, may serve privacy interests by ensuring that only certain individuals (as opposed to the general public, for example) are aware of the welfare and/or circumstances of the user of user device 201-1. In such implementations, the password or other information may have been associated with display kit 220 in one or more ways, such as by registering an identifier printed on, or otherwise assigned to, display kit 220 along with a password, a response to a question that family members would know the answer to (e.g., what is the maiden name of the user's mother?), etc., with application server 240. Additionally, or alternatively, application server 240 may provide storage and/or query services such that user device 210 (e.g., user device 210-2) may perform a search for a message pattern, or encoding/decoding thereof, corresponding to a particular user device 210 (e.g., user device 210-1) and/or display kit 220, thereby enabling, for example, another user device (e.g., user device 210-2) to proactively query application server 240 for messages detected by vehicle communication device 230 from a particular user device (e.g., user device 210-1).

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 4:
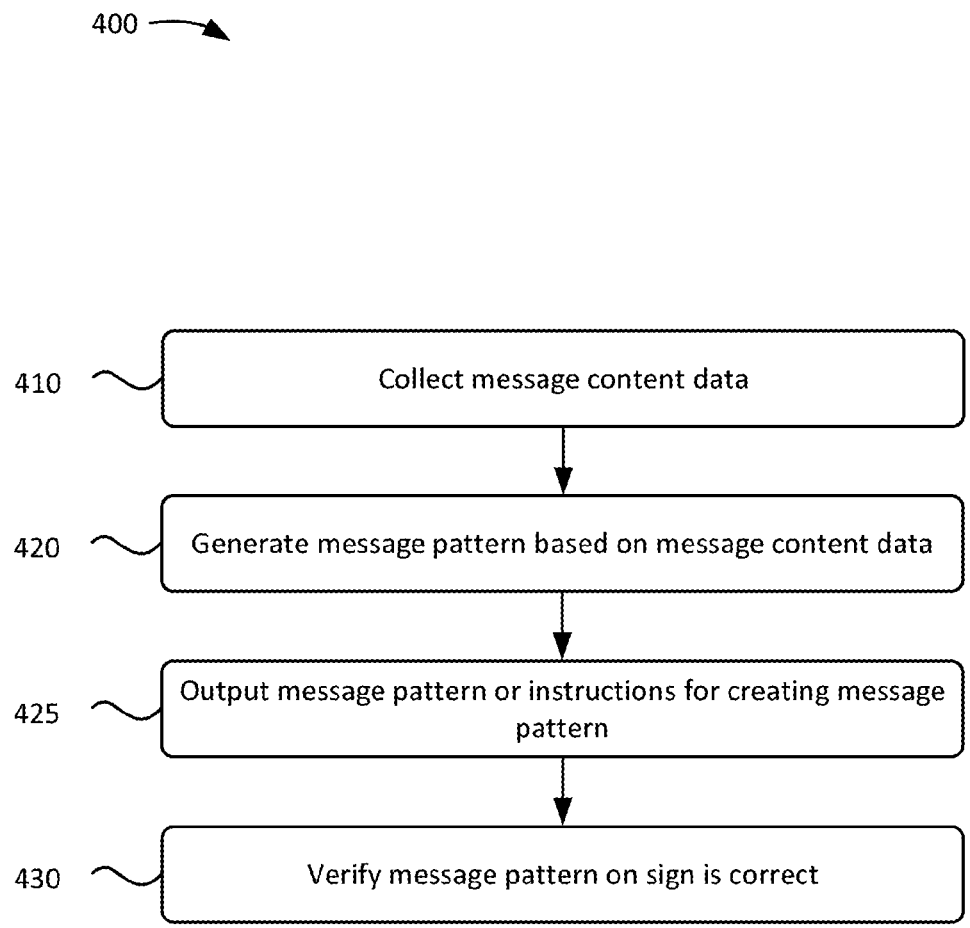
FIG. 4 illustrates a flowchart of an example process for assisting a user in creating a sign.

FIG. 4 illustrates a flowchart of an example process 400 for assisting a user in creating sign 300. In some implementations, process 400 may be performed by user device 210. FIGS. 5-8 will be referred to in the description of process 400.

As shown in FIG. 4, process 400 may include collecting message content data (block 410). For example, user device 210 may collect message content data. In some implementations, user device 210 may collect message content data from a user of user device 210 and/or from information stored by user device 210 (e.g., information collected by user device 210 on a previous occasion). Message content data may include one or more types of information relating to a user of user device 210, providing rescue services to the user of user device 210, and/or information of interest to one or more individuals concerned with the circumstances and/or welfare of the user of user device 210. Examples of message content data may include a name of the user, initials of the user, a date, a time of day, a description of a geographic location of the user (e.g., a reference to nearby points of interest, coordinates using one or more visual reference points, etc.), a medical condition of the user, whether the user is taking and/or in need of medication, an availability of food, water, and/or shelter to the user, a number of individuals with the user, information about individuals with the user, whether the user has been displaced (e.g., from a home, a place of work, etc.), etc.

Figure 5:
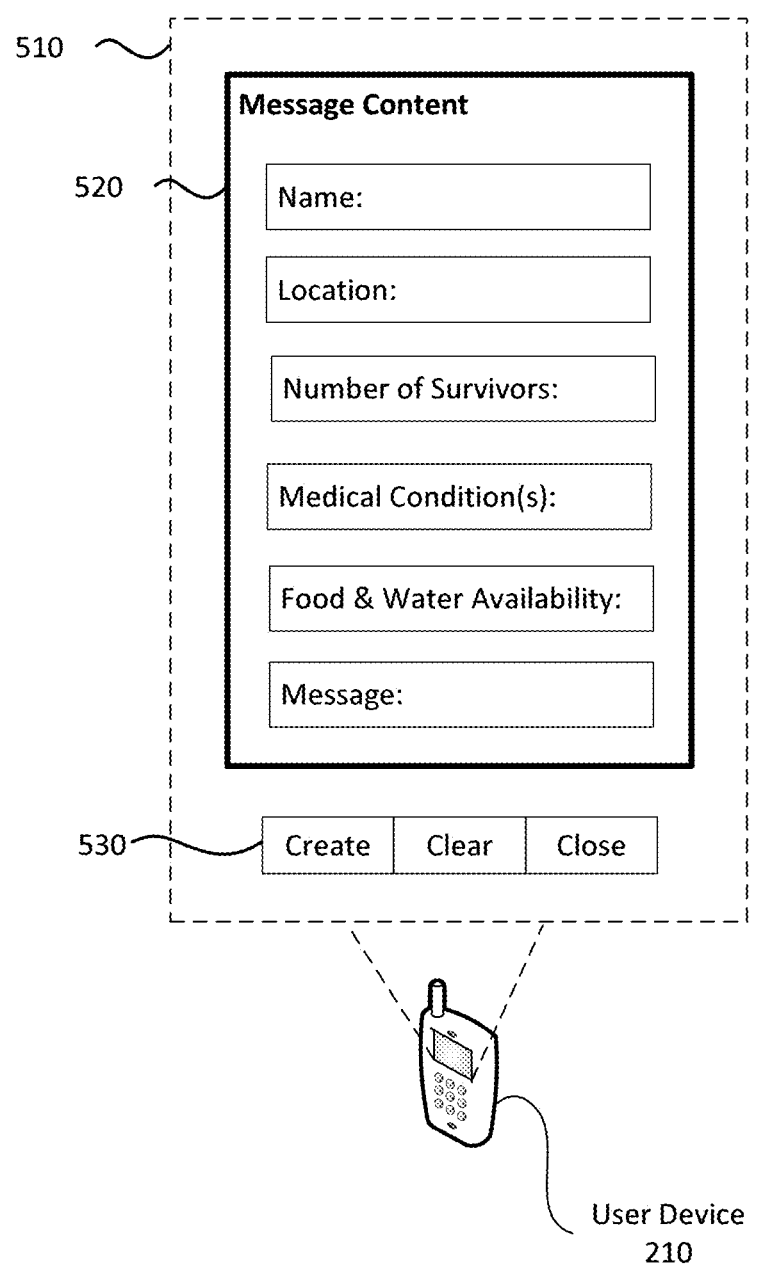
FIG. 5 illustrates an example implementation for collecting message content data.

FIG. 5 illustrates an example implementation for collecting message content data. As shown, user device 210 may collect message content data by providing display 510 that includes list of message content prompts 520 and command buttons 530. As depicted, list of content prompts 520 may include one or more text boxes and/or another types of prompts corresponding to specific types of information (e.g., a name, a location, a number of survivors, medical condition(s), food & water availability, etc.) that the user may enter. List of content prompts 520 may also, or alternatively, include a text box and/or another type of prompt for the user of user device 210 to input a freeform message of the user's choosing, represented in FIG. 5 by a text box entitled Message. Command buttons 530 may include one or more selectable interface objects, such as a Create button to create a message pattern based on message content provided by the user, a Clear button to clear message content provided by the user from display 510, a Close button to close list of message content prompts 520 and/or message pattern application 215 corresponding thereto.

Referring back to FIG. 4, process 400 may include generating a message pattern based on message content data (block 420). For example, user device 210 may generate a message pattern that encodes a particular message that is determined based on the message content data. A message pattern may include message content data that has been encoded into a machine-readable code, such as a QR Code, a barcode (which may include extended channel interpretation (ECI) technologies), an American Standard Code for Information Interchange (ASCII) code, a newly created code that is customized according to one or more implementations described herein, and/or one or more other types of codes that is readable by a machine (e.g., by vehicle communication device 230). The message pattern and/or machine-readable code may include a color scheme that involves two or more colors, such as the black and white color schemes of a QR Code and a barcode.

Process 400 may include outputting the message pattern or instructions for creating the message pattern, to a user (block 425). The instructions may include, for example, a graphical display of the message pattern with an indication to copy the message pattern. Alternatively or additionally, the instructions may include detailed instructions relating to how to construct the message pattern (e.g., in the context of display panel 310, the instructions may be a list of which blocks in the grid should be darkened).

Figure 6:
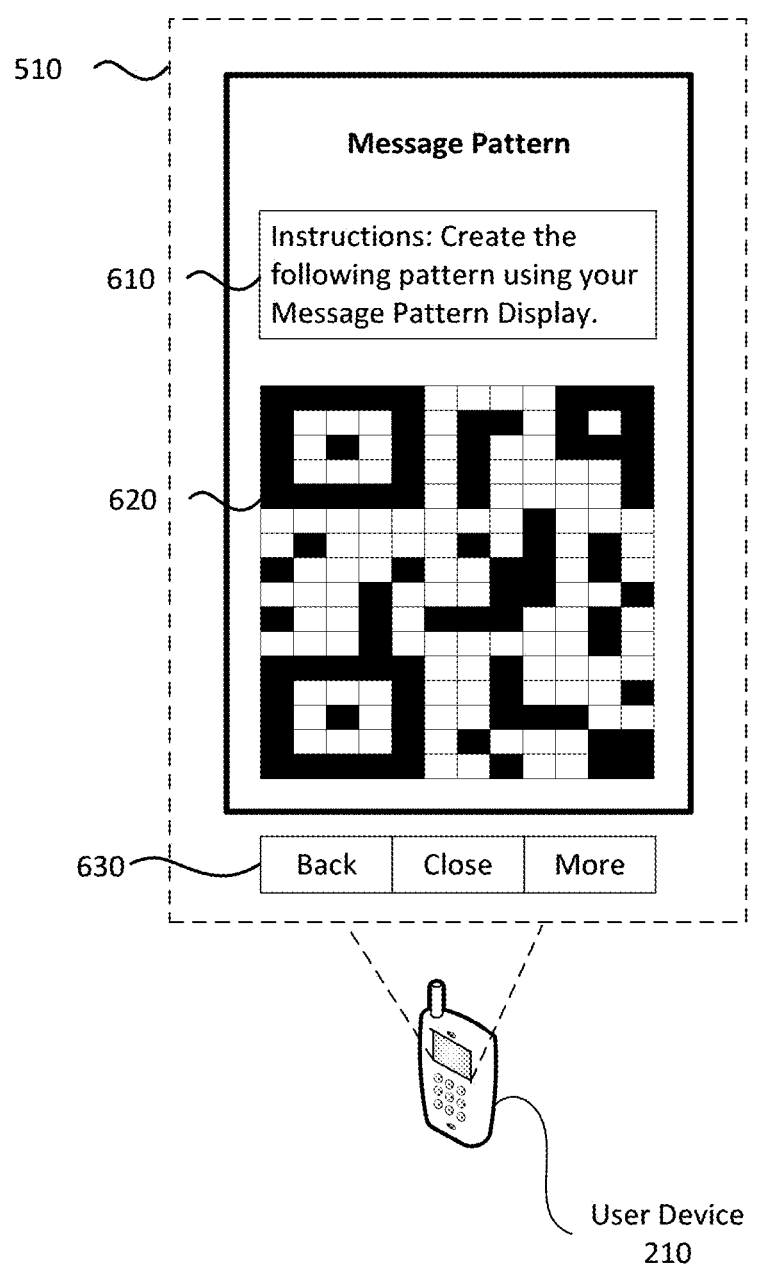
FIG. 6 illustrates an example implementation for generating a message pattern based on message content data.

FIG. 6 illustrates examples relating to the implementation of blocks 420 and 425 of process 400. As shown, user device 210 may generate message pattern 620 by encoding a message, corresponding to the message content data, to obtain message pattern 620. Instructions 610 may include instructions for creating sign 300. In some implementations, the instructions may include a graphical representation of a message pattern, such as message pattern 620. Generating message pattern 620 by user device 210 may enable the user to assemble sign 300 in a manner that communicates message pattern 620 to a rescue vehicle overhead. For instance, the user may view message pattern 620 of display 510 and manually copy message pattern 620 onto display panel 310 using the visual representation of message pattern 620 on display 510 as a reference.

As another example, the output from user device 210 does not have to be a graphical pattern per-se. The output could be instructions for creating a message pattern. For example, if display kit 220 includes a sign with a blank grid of labeled boxes (e.g., A1, A2, A3, B1, B2, B3, etc.), the output from user device 210 may include instructions to darken or cover certain boxes of the sign (e.g., A2, B3, etc.). Additionally, or alternatively, user device 210 may play a more active role in assisting the user in copying message pattern 620 onto display panel 310 of display kit 220, as is described below with reference FIG. 7. Additionally, or alternatively, user device 210 may provide command buttons 630 that may include one or more selectable interface objects, such as a Back button for returning to a display for entering message content data (See, FIG. 5), a Close button to close display 510 and/or message pattern application 215 corresponding thereto, and a More button for accessing one or more additional types of command buttons.

Figure 7:
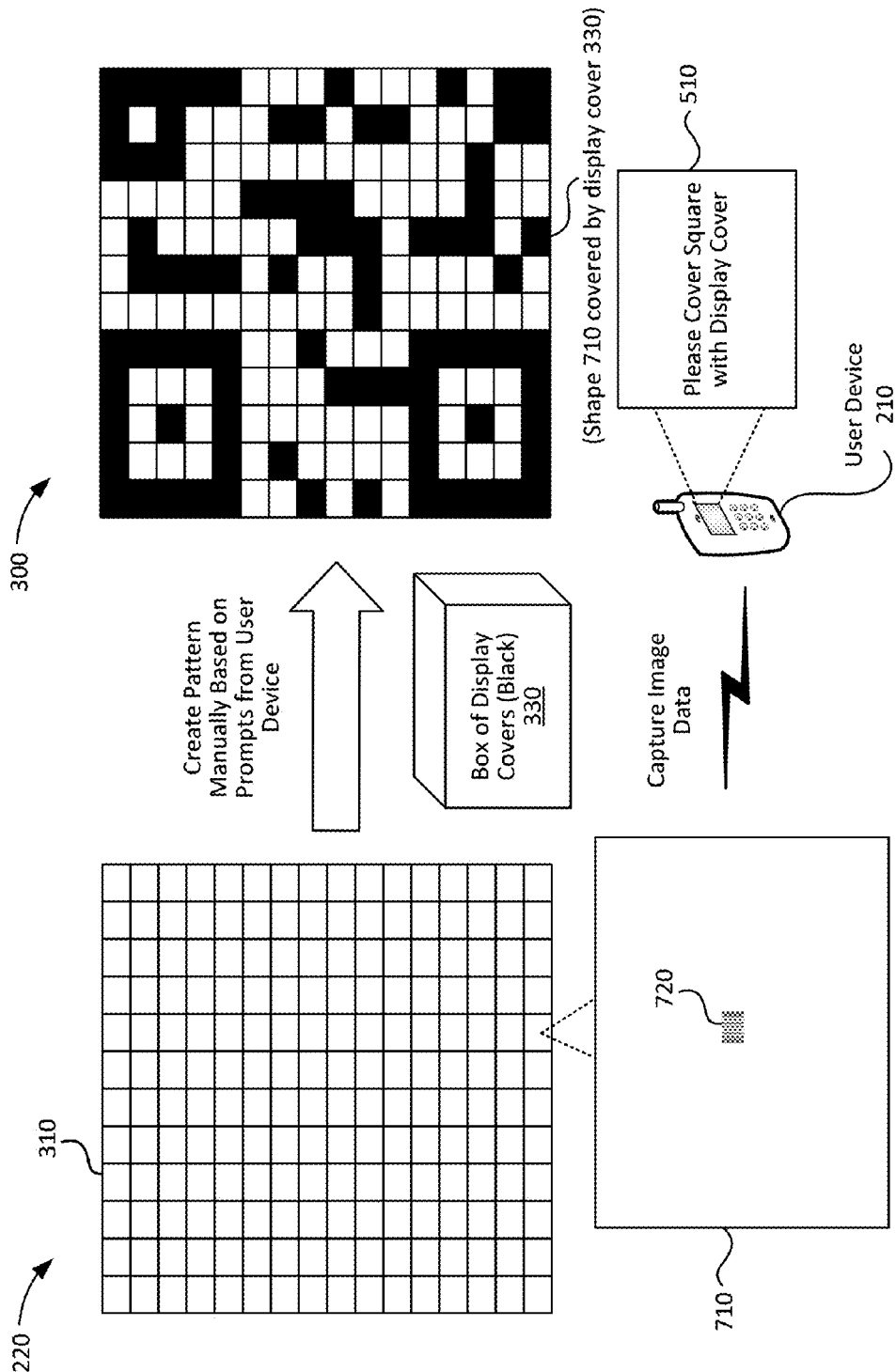
FIG. 7 illustrates an example implementation for assisting a user in creating a sign.

FIG. 7 illustrates an example implementation for assisting a user in creating sign 300. As shown, display panel 310 may be divided into a pattern of shapes 710 (e.g., squares, rectangles, octagons, circles, etc.), each of which includes an identifier 720, such as a barcode, a number, a letter, an alphanumeric sequence, etc. After providing user device 210 with message content data and/or creating message pattern 620 based on message content data (See, e.g., blocks 410 and 420), user device 210 may be used to scan identifier 720 of shape 710 in order to indicate to the user of user device 210 whether or not to manually cover shape 710 with display cover 330 (which may include a tile or another type of cover in a shape corresponding to shape 710), darken shape 710 with a marker or with tape, scratch off a covering film to make a light/dark contrast, etc. (As shown in FIG. 7, multiple display covers 330 may be packed in a box of display covers 330). As such, user device 210 may simplify the process of creating a message pattern on display panel 310 by indicating to the user which shapes 710 need to be covered by display covers 330 on a shape-by-shape basis. In some implementations, identifier 720 may be relatively small, lightly shaded, etc., as represented by the expanded view of shape 710, so as to ensure that each shape 710 appears completely black or completely white or completely white (for example) when scanned from a distance by vehicle communication device 230. Additionally, or alternatively, display kit 220 may include one or more white display covers (e.g., in addition to black display covers 330) to cover writing, annotations, or other markings on display panel 310.

While display panel 310 is shown as being effectively blank prior to applying display covers 330, in some implementations, one or more shapes 710 of display panel 310 may be pre-configured with one or more display covers 330 (or one or more functionally analogous substitutes thereof). Said another way, the message pattern ultimately created on display panel 310 may already be partially completed prior to collecting message content data, generating a message pattern based on the message content data, and outputting the message pattern or instructions for creating the message pattern. In such implementations, the outputted message pattern and/or instructions for creating the message pattern may or may not include the portions of display panel 310 that are pre-configured with display covers 330. Pre-configuring one or more parts of display panel 310 may, for example, satisfy one or more standardized formatting requirements of the machine-readable code used to generate the message pattern and/or simplify the process of placing display covers 330 on display panel 310.

Referring again to FIG. 4, process 400 may include verifying that a message pattern on sign 300 is correct (block 430). For example, user device 210 may verify that a message pattern on sign 300 is correct. In some implementations, user device 210 may verify that the message pattern on sign 300 is correct by capturing image data (e.g., via a camera and/or another type of optical component of user device 210) corresponding to the message pattern on sign 300 and/or by comparing the image data to a message pattern created based on message content data (See, e.g., block 420). In some implementations, user device 210 may prompt a user of user device 210 to correct one or more shapes 710 of sign 300 based on, for example, a comparison of the image data and the message pattern created based on message content data.

Figure 8:
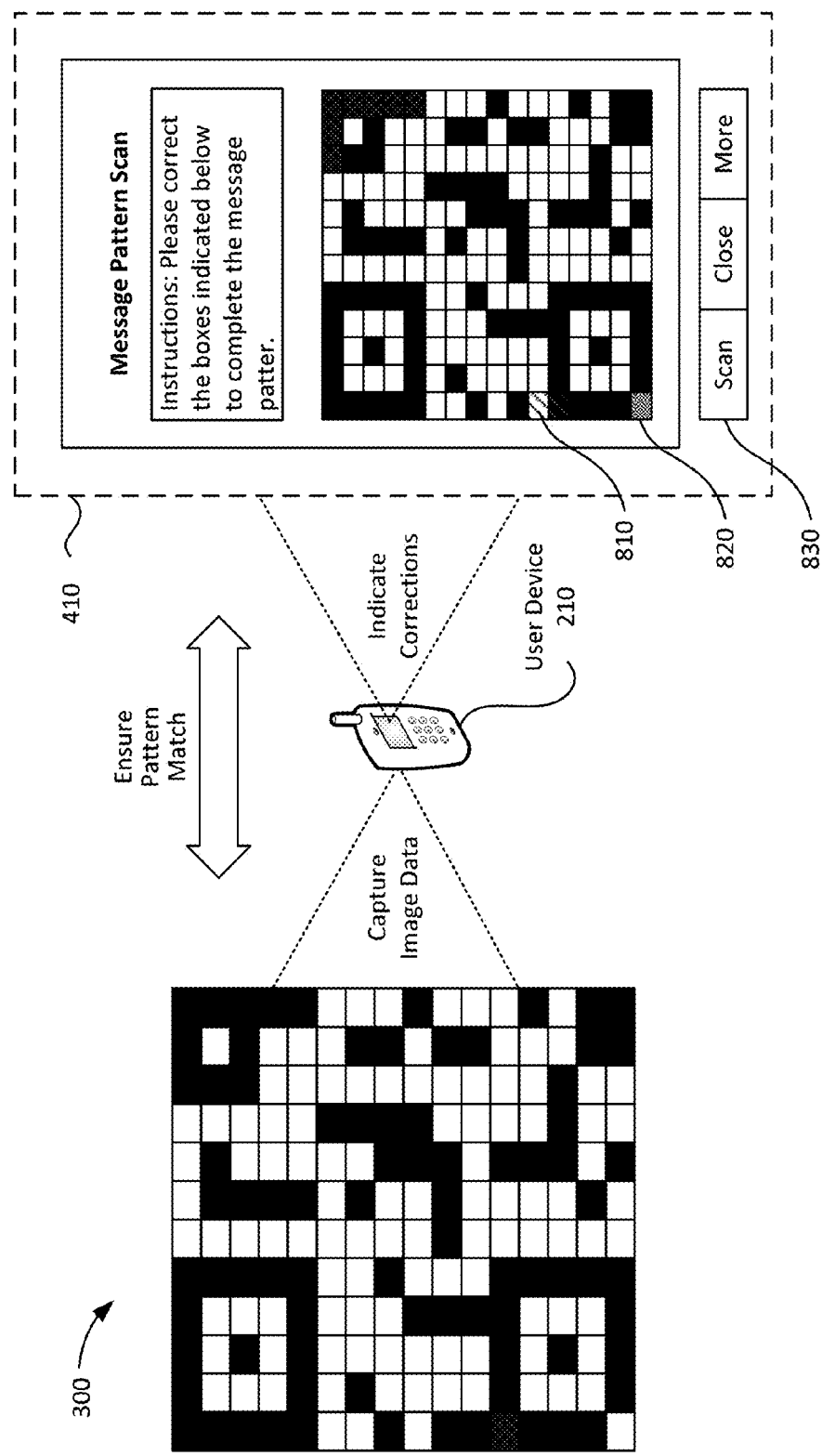
FIG. 8 illustrates an example implementation for verifying that a message pattern on a display panel of a display kit is correct.

FIG. 8 illustrates an example implementation for verifying that a message pattern on sign 300 is correct. As shown, user device 210 may capture image data from sign 300 and use display 510 to indicate to a user whether any shapes 710 of sign 300 need correction. In the example provided in FIG. 8, user device 210 may determine that shapes 810 and 820 require correction and/or may indicate that shape 810 should be white and shape 820 should be black, by using a shading or coloring scheme within the context of the message pattern on display 510. As such, a user may correct sign 300 by moving display cover 330 from shape 810 and moving display cover 330 to shape 820. User device 210 may also, or alternatively, include one or more command buttons 830 in display 510, such as a Scan button to capture additional image data from display kit 220 (e.g., after correcting display kit 220), a Close button for executing message pattern application 215 installed on user device 210, a More button for accessing one or more additional command buttons 830, etc.

As described above, FIGS. 5-8 provide example implementations of operations shown in FIG. 4. It should be noted, however, that while FIG. 4 shows a flowchart diagram of an example process 400 for creating a message pattern on a display kit, a process for creating a message pattern on a display kit may include fewer operations, different operations, differently arranged operations, and/or additional operations than depicted in FIG. 4. Similarly, while FIGS. 5-8 show example implementations with various features, in other implementations, example implementations may include fewer features, different features, differently arranged features, and/or additional features than the features depicted in FIGS. 5-8.

Figure 9:
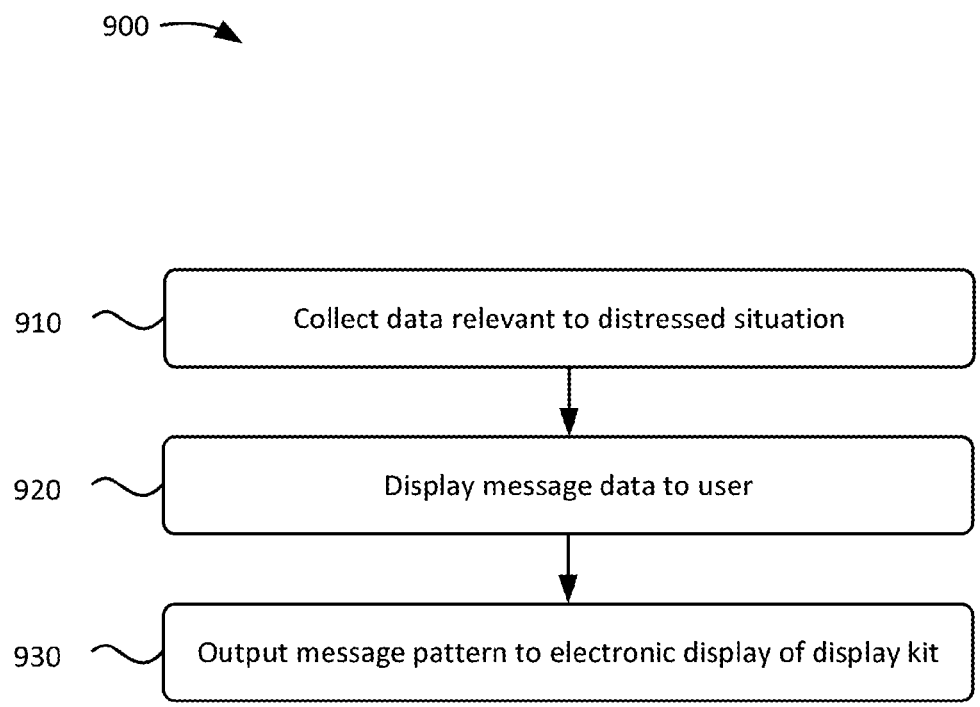
FIG. 9 illustrates a flowchart of an example process for assisting a user in creating sign.

FIG. 9 illustrates a flowchart of an example process 900 for assisting a user in creating sign 300 using display kit 220. In some implementations, process 900 may be performed by user device 210. In some implementations, some or all of the blocks of process 900 may be performed by one or more other devices. For instance, some or all of the blocks of process 900 may be performed by user device 210.

As shown in FIG. 9, process 900 may include collecting data relevant to a distressed situation (block 910). For example, user device 210 may collect data relevant to a distressed situation. In some implementations, user device 210 may collect relevant to a distressed situation from a user of user device 210 and/or from information stored by user device 210 (e.g., information collected by user device 210 on a previous occasion). Data relevant to a distressed situation may include one or more types of information relating to a user of user device 210, providing rescue services to the user of user device 210, and/or information of interest to one or more individuals concerned with the circumstances and/or welfare of the user of user device 210. Examples of data relevant to a distressed situation may include a name of the user, initials of the user, a date, a time of day, a description of a geographic location of the user (e.g., a reference to nearby points of interest, coordinates using one or more visual reference points, etc.), a medical condition of the user, whether the user is taking and/or in need of medication, an availability of food, water, and/or shelter to the user, a number of individuals with the user, information about individuals with the user, etc.

Process 900 may also include displaying message data to a user (block 920). The message data may include a message pattern, based on the data relevant to the distressed situation, that has been encoded into a machine-readable code, such as a QR Code, a barcode (which may include extended channel interpretation (ECI) technologies), an American Standard Code for Information Interchange (ASCII) code, a newly created code that is customized according to one or more implementations described herein, and/or one or more other types of codes that is readable by a machine (e.g., by vehicle communication device 230). In some implementations, user device 210 may also, or alternatively, provide the user with one or more written and/or graphical instructions when displaying message data to the user. Displaying message data to the user may enable the user to manually create sign 300 using display kit 220.

Process 900 may include outputting message pattern to an electronic display (block 930). For example, user device 210 may output a message pattern to an electronic display (e.g., an electronic version of display panel 310 of display kit 220). In some implementations, user device 210 may output the message pattern to the electronic display by a wired or wireless connection with the electronic display. The electronic display may reproduce the message pattern on the electronic display.

While FIG. 9 shows a flowchart diagram of an example process 900 for creating sign 300 using display kit 220, a process for assisting a user in creating sign 300 may include fewer operations, different operations, differently arranged operations, and/or additional operations than depicted in FIG. 9.

Figure 10:
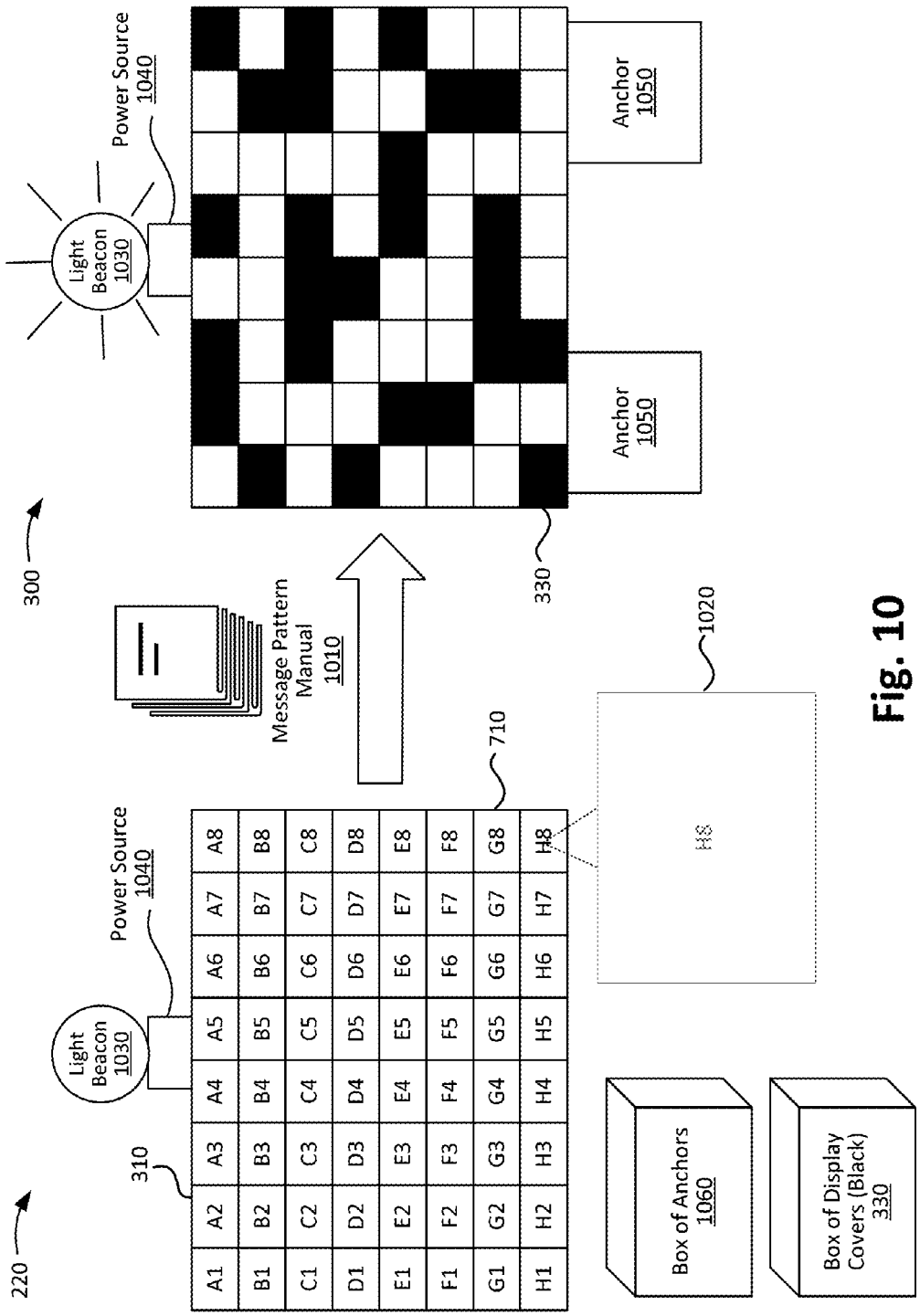
FIGS. 10-11 illustrate example implementations for creating a sign with a display kit and without a user device.
Figure 11:
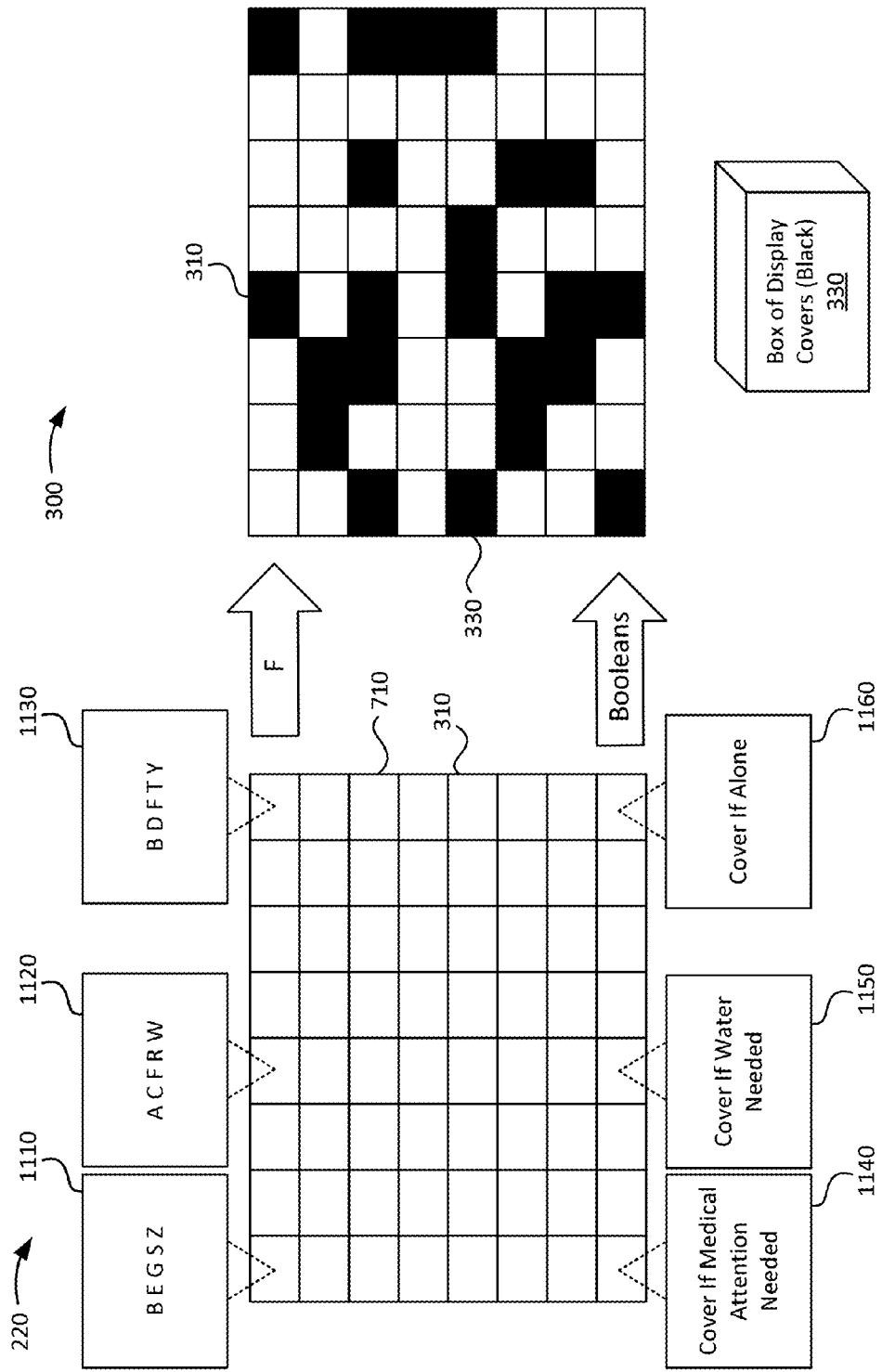

FIGS. 10-11 illustrate example implementations for manually creating sign 300 with display kit 220 and without user device 210. In this implementation, display kit may include message pattern manual 1010. Message pattern manual 1010 may include one or more instructions for creating sign 300 using display kit 220. For example, message pattern manual 1010 may include instructions for arranging display covers 330 on display panel 220 to create a message pattern corresponding to a distressed situation of the user. Additionally, or alternatively, message pattern manual 1010 may include instructions for attaching light beacon 1030 to power source 1040, power source 1040 to display panel 220, anchors 1050 to display panel 220, etc.

As shown in FIG. 10, a user may create a message pattern using display kit 220 by placing one or more display covers 330 on display panel 310 in a pattern consistent with instructions (and/or examples) provided by message pattern manual 1010. Examples of such instructions may include how to create a message pattern to indicate a name, a date, a time of day, a description of a geographic location of the user, a medical condition of the user, an availability of food, water, and shelter to the user, a number of individuals with the user, information about individuals with the user, etc. An example of possible instructions, for certain predefined messages, is illustrated in Table I, below. In Table I, the instructions may define a list of boxes to darken, on display panel 310, to obtain a message pattern that represents the message that is to be sent.

TABLE I

| MESSAGE TO SEND | BOXES TO DARKEN |
| --- | --- |
| NEED URGENT MEDICAL ATTENTION | A1, A3, C2 . . . |
| NEED FRESH WATER IMMEDIATELY | B2, B3, D2, . . . |
| NEED RESCUE, BUT AM NOT IN IMMEDIATE DANGER | C1, C2, C3 . . . |

In some implantations, the pattern may include a QR code, an ASCII code, one or more Boolean indicators (e.g., an answer to a yes/no question), and/or another type of code such as a code that is customized for certain dimensions (e.g., the dimension of display panel 310 and/or display covers 330), for certain types of disasters (e.g., an earthquake, a flood, a hurricane, a tsunami, etc.), for certain situations (e.g., to indicate whether a building or city block is abandoned), etc. Message pattern manual 1010 may provide instructions in terms of one or more identifiers (e.g., A1, A2, A3, etc.) associated with each shape 710 of display panel 310. In the example provided in FIG. 8, each shape 710 includes a letter/ number combination corresponding to rows (A-H) and columns (1-8) of display panel 310. In some implementations, identifiers may be relatively small and/or lightly shaded, as represented by the expanded view of shape 1020, so as to ensure that each shape 710 appears completely black or completely white (for example) when scanned from a distance by vehicle communication device 230. Additionally, or alternatively, display kit 220 may include one or more white display covers (e.g., in addition to black display covers 330) to cover writing, annotations, or other markings on display panel 310.

Additionally, or alternatively, display kit 220 may include light beacon 1030, power source 1040, and/or anchors 1050. Light beacon 1030 and/or power source 1040 may provide one or more functionalities, such as helping a rescue vehicle locate sign 300. Anchors 1050 (which may be packaged in a box of anchors 1060) may include one or more types of apparatuses that may be attached to display panel 310 to, for example, secure sign 300 to a particular location so that sign 300 is not washed away by changing tides or flood waters, blown away by the wind, or otherwise displaced. Anchors 1050 may also, or alternatively, enable a user to prop up sign 300 in a particular position, to a particular height, at a particular angle, or in a particular manner to, for example, increase visibility of sign 300.

Referring now to FIG. 11, display kit 220 may include display panel 310 with one or more instructions printed on a front side and/or a back side of display panel 310. In some implementations, the instructions may include an ASCII-like system for representing a letter and/or spelling a word. For instance, one or more shapes 710 of display panel 310 may include a series of letters such that if the user wants a row of display panel 310 to indicate a particular letter then each shape 710 in that row, the list for which contains that letter, should be covered by display cover 330. For instance, if the user wants a row corresponding to shapes 1110, 1120, and 1130 to indicate the letter "F," then the user would cover shape 1120 and 1130, but not shape 1110, since shapes 1120 and 1130 include an "F" in their lists but shape 1110 does not. Since shapes 1110-1130 only include three of the eight shapes in that row, if any other shapes 710 in the row includes an "F," then those shapes 710 that also include an "F" would need to be covered by display cover 330 in order for that row to indicate an "F." Using such an approach, the user may use several rows of display panel 310 to include a word, an acronym, or other type of message in the final message pattern of sign 300.

One or more shapes of display panel 310 may also, or alternatively, function as a Boolean-type value corresponding to a particular question, condition, etc. For instance, shapes 1140, 1150, and 1160 each include a condition that, if covered, represents a confirmation of that condition. As such, the final message pattern of sign 300 may indicate, in this particular example, that the user (1) needs medical attention, (2) needs water, and (3) is not alone, since shapes 1140 and 1150 are covered by display covers 330 but shape 1160 is not. In some implementations, one or more other types of signaling techniques may be used to convey a message using display kit 220. For instance, a sequence of adjacent shapes 710 may be used to indicate a linear graph representing, for example, whether the number of individuals with the user is greater than 2, greater than 5, greater than 10, etc., depending on which of the adjacent shapes is covered by display cover 330. In such implementations, instructions presented on a front side of display panel 310 may be relatively small, presented using a grey or light-colored print, etc., so as to ensure that each shape 710 appears completely or substantially black or completely white when scanned from a distance by vehicle communication device 230. Additionally, or alternatively, display kit 220 may include one or more white display covers (e.g., in addition to black display covers 330) to cover writing, annotations, or other markings on display panel 310.

Figure 12:
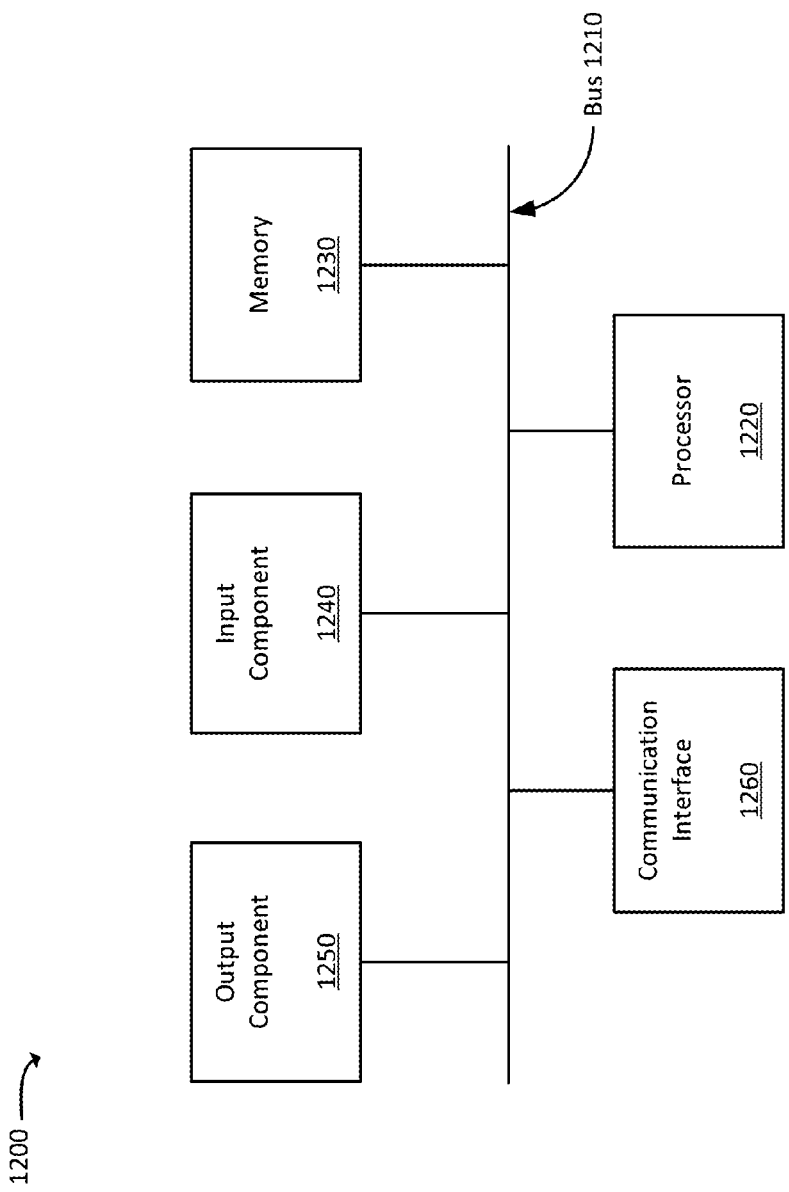
FIG. 12 illustrates example components of one or more devices, according to one or more implementations described herein.

FIG. 12 is a diagram of example components of device 1200. One or more of the devices described above (e.g., with respect to FIGS. 1, 2, and 5-8) may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes (LEDs), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIGS. 4 and 9, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    collecting, by a user device, message content data from a user of the user device, the message content data comprising information descriptive of the user and circumstances of the user;
    generating, by the user device, a message pattern based on the message content data, the message pattern comprising a machine-readable code representing the message content data from the user of the user device;
    displaying, by the user device, instructions relating to recreating the message pattern;
    capturing, by the user device, an image of the recreated message pattern;
    determining, by the user device, whether the captured image corresponds to the generated message pattern; and
    outputting, by the user device, an indication of whether the captured image corresponds to the generated message pattern.

2. The method of claim 1, wherein the message pattern comprises at least one of
    a Quick Response (QR) code,
    a barcode,
    an ASCII (American Standard Code for Information Interchange) code, or
    at least one Boolean indicator.

3. The method of claim 1, wherein the message content data comprises at least one of
    a name of the user,
    initials of the user,
    a medical condition of the user,
    a medication proscribed to the user,
    a number of individuals with the user,
    a description of a geographical location of the user,
    whether food is available to the user,
    whether water is available to the user,
    whether shelter is available to the user, or
    information regarding at least one individual with the user.

4. The method of claim 1, further comprising:
    receiving an indication of a type of display device possessed by the user;
    wherein displaying the instructions relating to recreating the message pattern includes displaying instructions customized to the type of display device.

5. The method of claim 1, further comprising:
    prompting the user of the user device to correct the recreation of the message pattern when the captured image does not correspond to the generated message pattern.

6. The method of claim 5, wherein prompting the user of the user device to correct the recreation of the message pattern comprises indicating a shape of a plurality of shapes of the recreation of the message pattern that requires correction.

7. The method of claim 1, wherein the displayed instructions includes instructions defining locations, on a display device, that are to be marked.

8. The method of claim 1, further comprising:
    receiving image data corresponding to an identifier of a shape of the recreation of the message pattern; and
    indicating to the user, based on the identifier, whether the shape should be covered by a display cover in order to copy the message pattern to the display panel.

9. A system, comprising:
    a user device, comprising:
        a non-transitory memory device storing:
            a plurality of processor-executable instructions; and
            a processor configured to execute the processor-executable instructions, wherein executing the processor-executable instructions causes the processor to:
                collect message content data from a user of the user device, the message content data comprising information descriptive of the user and circumstances of the user,
                generate a message pattern based on the message content data, the message pattern comprising a machine-readable code representing the message content data from the user of the user device,
                display instructions relating to recreating the message pattern, and capture an image of the recreated message pattern,
determine whether the captured image corresponds to the generated message pattern, and
output an indication of whether the captured image corresponds to the generated message pattern.

10. The system of claim 9, wherein the message pattern comprises at least one of
a QR code,
a barcode,
an ASCII code, or
at least one Boolean indicator.

11. The system of claim 9, wherein the message content data comprises at least one of
a name of the user,
initials of the user,
a medical condition of the user,
a medication proscribed to the user,
a number of individuals with the user,
a description of a geographical location of the user,
whether food is available to the user,
whether water is available to the user,
whether shelter is available to the user, or
information regarding at least one individual with the user.

12. The system of claim 9, executing the processor-executable instructions causes the processor to:
receive an indication of a type of display device possessed by the user;
wherein displaying the instructions relating to recreating the message pattern includes displaying instructions customized to the type of display device.

13. The system of claim 9, wherein executing the processor-executable instructions causes the processor to:
prompt the user of the user device to correct the recreated message pattern when the captured image does not correspond to the generated message pattern.

14. The system of claim 13, wherein executing the processor-executable instructions, to prompt the user of the user device to correct the recreated message pattern, causes the processor to:
indicate a shape of a plurality of shapes of the recreated message pattern that requires correction.

15. The system of claim 9, wherein the displayed instructions includes instructions defining locations, on a display device, that are to be marked.

16. The system of claim 9, wherein executing the processor-executable instructions causes the processor to:
receive image data corresponding to an identifier of a shape of the recreated message pattern; and
indicate to the user, based on the identifier, whether the shape of the recreated message pattern should be covered by a display cover in order to copy the message pattern.

17. A display kit, comprising:
a display panel comprising a front surface comprising a first color, a grid defining a plurality of shapes, and an identification system for uniquely identifying each shape of the plurality of shapes defined by the grid;
a plurality of display covers comprising a second color, each display cover of the plurality of display covers comprising a single shape of the plurality of shapes defined by the grid of the display panel; and
at least one instruction to create a message pattern corresponding to a machine-readable code by positioning at least one display cover of the plurality of display covers on the front surface of the display panel based on the identification system of the display panel,
wherein the first color and the second color correspond to a color scheme of the machine-readable code.

18. The display kit of claim 17, further comprising a beacon configured to emit a signal indicating a location of the display device.

19. The display kit of claim 18, further comprising a power source for providing power to the beacon.

20. The display kit of claim 17, wherein the display panel comprises at least one elastic tie for physically securing the display panel to a particular location and a flexible material capable of being folded into a small area.

* * * * *